(12) United States Patent
Hsiao et al.

(10) Patent No.: US 11,488,286 B2
(45) Date of Patent: Nov. 1, 2022

(54) METHOD FOR DETERMINING MOIRE PATTERN, METHOD FOR SUPPRESSING MOIRE PATTERN AND CIRCUIT SYSTEM THEREOF

(71) Applicant: REALTEK SEMICONDUCTOR CORP., Hsinchu (TW)

(72) Inventors: Ching-Ju Hsiao, Hsinchu (TW); Wen-Tsung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 157 days.

(21) Appl. No.: 17/015,131

(22) Filed: Sep. 9, 2020

(65) Prior Publication Data
US 2021/0201449 A1 Jul. 1, 2021

(30) Foreign Application Priority Data

Dec. 25, 2019 (TW) ................................ 108147489

(51) Int. Cl.
*G06T 5/00* (2006.01)
*H04N 9/67* (2006.01)
(Continued)

(52) U.S. Cl.
CPC ............ *G06T 5/002* (2013.01); *G06T 7/0002* (2013.01); *G06T 7/73* (2017.01); *H04N 9/646* (2013.01);
(Continued)

(58) Field of Classification Search
CPC ......... G06T 5/002; G06T 7/0002; G06T 7/73; G06T 2207/10024; G06T 2207/30168;
(Continued)

(56) References Cited

U.S. PATENT DOCUMENTS 6,850,651 B2 * 2/2005 Zaklika .................... G06T 5/20
358/533
6,950,211 B2 * 9/2005 Trifonov .................. G06T 5/20
358/463
(Continued)

FOREIGN PATENT DOCUMENTS

CN 104717474 A 6/2015
CN 108418997 A 8/2018
(Continued)

*Primary Examiner* — Jose L Couso
(74) *Attorney, Agent, or Firm* — Li & Cai Intellectual Property (USA) Office

(57) ABSTRACT

A method for determining and suppressing Moiré pattern, and a circuit system thereof are provided. In the method, a brightness value of pixels of an image can be obtained. For each of the pixels of the image, a detection window is provided for calculating a Moiré pattern response value of a plurality of critical pixels and corresponding adjacent pixels. The critical pixels within the detection window are selected for determining a type of Moiré pattern. After, it is to compare the brightness values of the critical pixels and the corresponding adjacent pixels within the detection window. The comparison results can be used to determine the brightness characteristics of the pixels through a statistical method. Moiré pattern response value and the statistics are used to determine type and position of the Moiré pattern. A color noise suppression process is performed on the pixels to be determined as Moiré pattern.

19 Claims, 12 Drawing Sheets

(51) Int. Cl.
*H04N 9/64* (2006.01)
*G06T 7/00* (2017.01)
*G06T 7/73* (2017.01)
*H04N 9/78* (2006.01)

(52) U.S. Cl.
CPC ............. *H04N 9/67* (2013.01); *H04N 9/78* (2013.01); *G06T 2207/10024* (2013.01); *G06T 2207/30168* (2013.01)

(58) Field of Classification Search
CPC . G06T 7/55; G06T 7/90; H04N 9/646; H04N 9/67; H04N 9/78; G03F 7/706; G03F 5/00; G03F 5/22; G01N 21/956; G01N 21/95607; G01N 21/95615; G02B 27/60; G01B 11/25; G01B 11/254; B42D 25/342; G01V 8/00
See application file for complete search history.

(56) References Cited

U.S. PATENT DOCUMENTS

| | | | | |
|---|---|---|---|---|
| 2002/0053647 | A1* | 5/2002 | Shiratsuchi | G01N 21/956 |
| | | | | 250/559.44 |
| 2005/0122506 | A1* | 6/2005 | Wegmann | G03F 7/706 |
| | | | | 356/124 |

FOREIGN PATENT DOCUMENTS

| | | | | |
|---|---|---|---|---|
| CN | 113129389 | * | 12/2019 | ............. G06T 7/90 |
| CN | WO 2020244021 | * | 12/2020 | ............. G06T 5/00 |
| TW | 200709103 A | | 3/2007 | |

\* cited by examiner

| Y(i-2,j-2) | Y(i-2,j-1) | Y(i-2,j) | Y(i-2,j+1) | Y(i-2,j+2) |
|---|---|---|---|---|
| Y(i-1,j-2) | Y(i-1,j-1) | Y(i-1,j) | Y(i-1,j+1) | Y(i-1,j+2) |
| Y(i,j-2) | Y(i,j-1) | Y(i,j) | Y(i,j+1) | Y(i,j+2) |
| Y(i+1,j-2) | Y(i+1,j-1) | Y(i+1,j) | Y(i+1,j+1) | Y(i+1,j+2) |
| Y(i+2,j-2) | Y(i+2,j-1) | Y(i+2,j) | Y(i+2,j+1) | Y(i+2,j+2) |

|   |   |   |   |   |
|---|---|---|---|---|
| 1 |   | -2 |   |   |
|   | 1 |   |   |   |
| -2 |   | 4 |   | -2 |
|   |   |   | 1 |   |
|   |   | -2 |   | 1 |

FIG. 6C

|   |   | -2 |   | 1 |
|---|---|----|---|---|
|   |   |    | 1 |   |
| -2 |  | 4  |   | -2 |
|   | 1 |    |   |   |
| 1 |   | -2 |   |   |

FIG. 7C

METHOD FOR DETERMINING MOIRE PATTERN, METHOD FOR SUPPRESSING MOIRE PATTERN AND CIRCUIT SYSTEM THEREOF

CROSS-REFERENCE TO RELATED PATENT APPLICATION

This application claims the benefit of priority to Taiwan Patent Application No. 108147489, filed on Dec. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a technology for determining Moiré pattern, and more particularly to a method for detecting Moiré pattern in different directions, calculating Moiré pattern feature comparison values, determining the Moiré pattern and suppressing the determined Moiré pattern, and a circuit system for implementing the method.

BACKGROUND OF THE DISCLOSURE

Moiré pattern is a common defect that occurs in images produced with various digital imaging techniques. A general reason that the Moiré pattern is formed is due to a high-frequency interference while processing the digital image formed by a photosensitive element, i.e., CCD or CMOS, of an image sensor. The digital image can be generated from a picture captured by a digital camera, a video produced by a digital video recorder, or an image scanned by a scanner. More specifically, the Moiré pattern is such as irregular stripes with colors and shapes formed in the image due to the high-frequency interference.

Furthermore, when photographing an article with densely formed patterns, such as a textile, highly-repetitive stripes or a display screen, some low-frequency stripes may occur to an image of the article if a pixel sampling frequency of the photosensitive element is close to a spatial frequency of the texture of the article. Furthermore, a Bayer filter is often used in the digital camera, the digital video recorder, or the scanner, which may cause the Moiré pattern to have color noises from different sampling frequencies of red, green, or blue visible lights. Consequently, the image with the Moiré pattern may be different from what a human eye can actually see.

For solving the above problem caused by the Moiré pattern, one conventional solution is to incorporate a low-pass filter to a lens of the camera. However, using the low-pass filter may cause the image to lose some image details even though it can reduce the Moiré pattern. One further solution for solving the Moiré pattern phenomena is to conduct a post-processing process in the image signal processor (ISP) to compensate the color values for the pixels adjacent to the portion determined as the Moiré pattern. The pixels of the portion to be determined as the Moiré pattern are characterized by lower brightness changes and higher color changes. However, the compensation may still reduce the saturation of the portion.

Thus, conventional technologies may not detect the Moiré pattern accurately. The color quality of the image may be reduced when misjudging the Moiré pattern. The effect of the conventional color compensation method may be restricted by hardware limitations, so that the Moiré pattern cannot be completely eliminated.

SUMMARY OF THE DISCLOSURE

The disclosure is related to a method for determining Moiré pattern, a method for suppressing Moiré pattern, and a circuit system for implementing the methods. One of the objectives is to treat the phenomena of the Moiré pattern in a digital image through an image processing technology. The technology is able to detect positions of the Moiré pattern so as to suppress the color noises based on the position of the Moiré pattern. The output image can therefore match the human visual perception.

In one embodiment of the method for determining the Moiré pattern, brightness information of a plurality of pixels of an image can be first obtained. The brightness information is such as brightness values of the pixels in a YUV (representative of brightness-chrominance-saturation) color space or an average value of three color channels in an RGB (red-green-blue) color space. A detection window is setting for selecting multiple critical pixels that are used to determine types of the Moiré pattern within the detection window. After that, a Moiré pattern response value of each of the multiple critical pixels and corresponding multiple adjacent pixels within the detection window can be calculated. The Moiré pattern response value is used to determine if the image has features of the Moiré pattern.

After that, for each of the pixels, the brightness information of the critical pixels is compared with the adjacent pixels corresponding to every critical pixel within the detection window. The comparison results are calculated so as to determine a brightness characteristic of the each pixel. Therefore, the type and position of the Moiré pattern within the image can be confirmed according to the Moiré pattern response value and statistical result.

In one aspect of the disclosure, in the step of calculating the Moiré pattern response value, a weighting mask is set in the detection window according to the type of Moiré pattern to be determined. The plurality of critical pixels are configured to have higher weighting values and the adjacent pixels are configured to have lower weighting values. The Moiré pattern response value is calculated by respectively multiplying the plurality of critical pixels and the corresponding adjacent pixels by the weighting values.

Further, the Moiré pattern response value with respect to each of pixels is compared with a first threshold so as to obtain brightness changes between the pixel and the adjacent pixels for determining if the image has features of the Moiré pattern. When comparing the brightness information between the plurality of critical pixels and the corresponding adjacent pixels, a second threshold is introduced to confirm the brightness characteristics of each pixel.

The type of Moiré pattern is classified as a horizontal Moiré pattern, a vertical Moiré pattern, a positive diagonal Moiré pattern, or a negative diagonal Moiré pattern.

Further, the method is to suppress the Moiré pattern for the pixels to be determined as part of the Moiré pattern. The pixels to be determined as Moiré pattern are mapped to a UV plane (i.e., a chrominance-saturation plane) of the YUV color space and colors of the pixels within the color-suppression range are suppressed to grayscale colors. Further, a gradual color-suppression range is distinct from the UV plane. A suppression rate is setting based on a distance from every pixel within the gradual color-suppression range in the UV plane to a coordinate center of the UV plane. Therefore, a color noise suppression process is performed on each of the pixels within the gradual color-suppression range according to the suppression rate.

According to one embodiment of the circuit system, the circuit system can be a digital image processor that performs the method for determining Moiré pattern and the method for suppressing Moiré pattern.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 3 is a schematic diagram depicting a process of determining directions of Moiré pattern in one embodiment of the disclosure;

FIG. 5A to FIG. 5C schematically show a process for determining horizontal and vertical Moiré patterns in one embodiment of the disclosure;

FIG. 6A to FIG. 6C schematically show a process for determining positive diagonal Moiré pattern according to one embodiment of the disclosure;

FIG. 7A to FIG. 7C schematically show a process for determining negative diagonal Moiré pattern according to one embodiment of the disclosure;

DETAILED DESCRIPTION OF THE EXEMPLARY EMBODIMENTS

Figure 1:
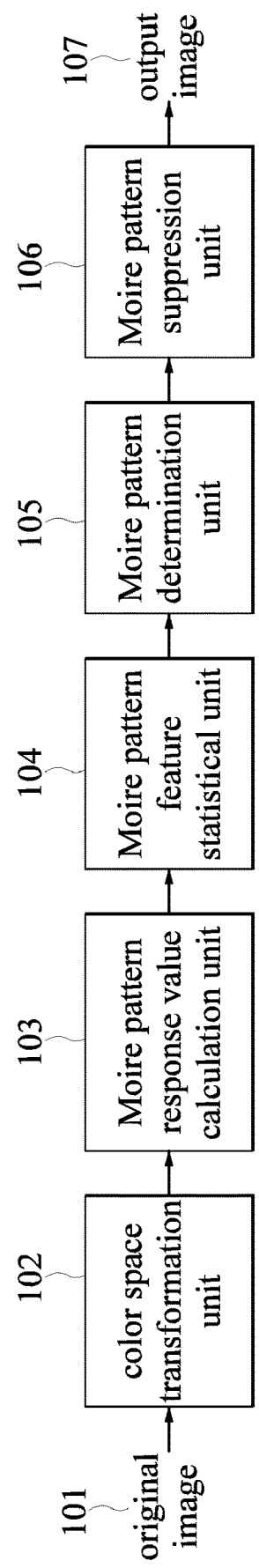
FIG. 1 is a functional block diagram depicting a circuit system for implementing a method for determining and suppressing Moiré pattern according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to the embodiments of a method for determining Moiré pattern, a method for suppressing Moiré pattern, and a circuit system for implementing the methods. In the method for determining Moiré pattern, a Moiré pattern response value and different directions of Moiré patterns are detected. The distribution of the information of pixels of an image can be used to determine the positions of Moiré pattern. Next, Moiré pattern feature comparison values are calculated so as to confirm a type of the Moiré pattern. After that, the method for suppressing Moiré pattern is used to suppress color noises in the pixels to the determined Moiré pattern.

The types of Moiré pattern can be essentially classified as a horizontal Moiré pattern, a vertical Moiré pattern, a positive diagonal Moiré pattern, or a negative diagonal Moiré pattern. For example, the circuit system can analyze every pixel or sampled pixels of the image one-by-one to determine if there are any horizontal, vertical, or positive/negative diagonal Moiré patterns. Therefore, the further process can be used to suppress the Moiré pattern. It should be noted that the brightness characteristics of the horizontal, vertical or positive/negative diagonal pixels can be used as the conditions to determine the repetitive and dense stripes features of the Moiré pattern.

Figure 2:
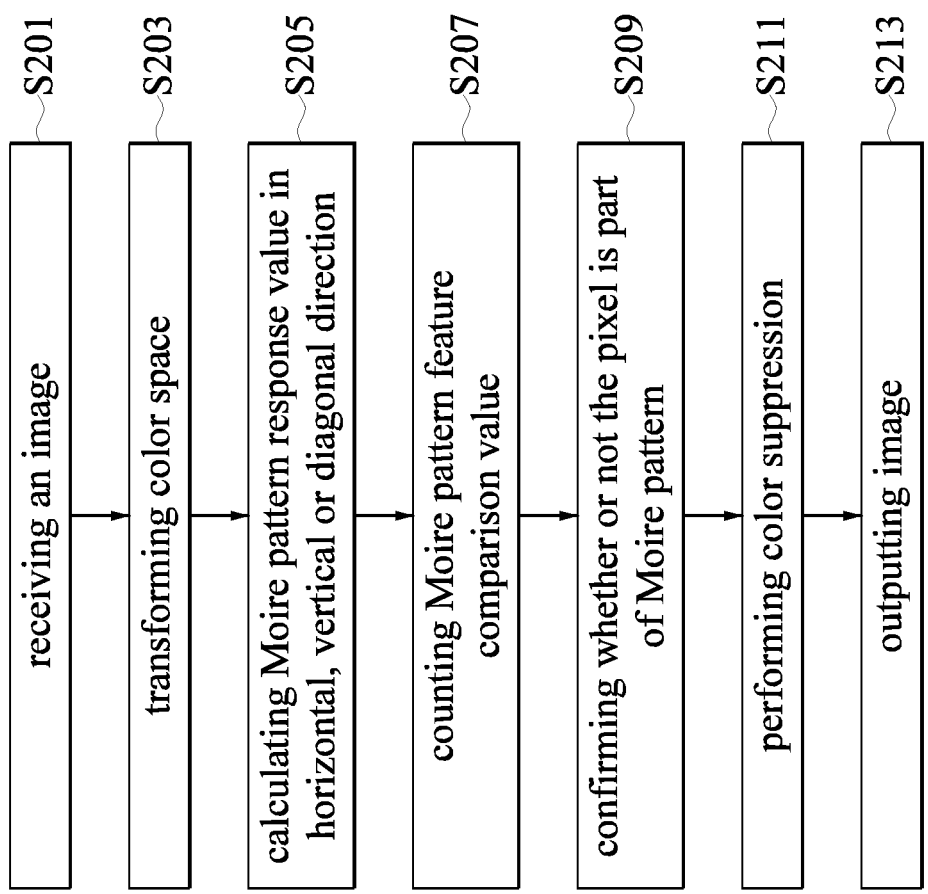
FIG. 2 shows a flow chart describing a process of the method for determining and suppressing Moiré pattern in one embodiment of the disclosure.

Reference is made to FIG. 1, which shows a function block diagram depicting the circuit system for implementing the method for determining and suppressing the Moiré pattern according to one embodiment of the disclosure. The circuit system can be implemented by a digital image processor or a specific computer system. The main components of the circuit system include a processor and a memory. The processor performs the method for determining and suppressing the Moiré pattern. The functionalities functioned by the processor can be the shown software-based and/or hardware-based color space transformation unit 102, Moiré-pattern-response-value calculation unit 103, Moiré pattern feature statistical unit 104, Moiré pattern determination unit 105 and Moiré pattern suppression unit 106. The circuit system depicted is used to perform the processes of determining the Moiré pattern and suppressing the Moiré pattern. Reference is also made to FIG. 2 which shows a flow chart and the functions of the process in one embodiment of the disclosure.

The circuit system shown in FIG. 1 receives an original image 101 (step S201, FIG. 2). The original image 101 can be a raw file of the image or the pixels within a specific color space. The color space transformation unit 102 transforms the original image 101 to a specific color space for further processes such as determining and suppressing the Moiré pattern (step S203, FIG. 2). The color space can be a YUV color space, an RGB color space, or the like. The brightness information of the image can be extracted in the color space. For example, in the YUV color space, the component 'Y' indicates the brightness value of the image; in the RGB color space, an average value of three color channels can be used as the reference to determine the brightness.

The circuit system can determine a detection window according to the hardware computing capability. In the detection window, it is determined if the pixels are in position with the Moiré pattern. Specifically, multiple critical pixels are selected for determining any types of Moiré patterns within the detection window. The pixels are pixel-by-pixel calculated to obtain a distribution of the critical pixels and the adjacent pixels in each area of the image (corresponding to the size of the detection window) so as to determine the positions of Moiré pattern.

In one of the aspects of the disclosure, a Moiré-pattern-response-value calculation unit 103 of the circuit system uses weighting values and brightness values of the pixels within the detection window to pixel-by-pixel calculate Moiré pattern response values of the pixels in a horizontal, a vertical or a diagonal direction (step S205). It should be noted that the Moiré pattern response value in the various directions can be used to determine whether or not each of the pixels matches the edge pixel feature of the Moiré pattern. After that, the Moiré pattern feature statistical unit 104 of the circuit system is to obtain a relationship of Moiré pattern features between the critical pixels that are used to determine directions of Moiré pattern and the adjacent pixels within every detection window. It should be noted that the brightness values of the pixels can be referred to so as to determine the Moiré pattern features such as the directions of Moiré pattern. The Moiré pattern feature statistical unit 104 performs a statistical method to calculate Moiré pattern feature comparison values of the adjacent pixels (step S207).

Next, the Moiré pattern determination unit 105 of the circuit system examines the Moiré pattern response values and the Moiré pattern feature comparison values by the threshold set by the system so as to confirm whether or not the current pixel is part of the Moiré pattern (step S209). The Moiré pattern suppression unit 106 performs color suppression upon the pixels that are determined as part of the Moiré pattern. In one of the aspects of the disclosure, the colors of pixels to be determined as the Moiré pattern can be suppressed to be grayscale colors, or alternatively, the colors are suppressed to be the grayscale colors according to different suppression rates that are set based on different levels of the Moiré pattern. The suppression rates are referred to so as to suppress the colors of pixels to grayscale colors (step S211). Consequently, an output image 107 is obtained through the suppression process is outputted (step S213).

Reference is made to FIG. 3, which shows a schematic diagram describing a method for determining Moiré pattern in one embodiment of the disclosure.

FIG. 3 shows an image with a 5×5 pixel array area. The size of the pixel array should be appropriately selected based on the hardware resource of the circuit system. A 'Y' value, e.g., the brightness value, of a YUV color space is referred to as a basis for calculation. In the 5×5 pixel array, a current pixel Y(i,j) is chosen as an origin of the area for marking the pixels adjacent to the current pixel. According to the present example, referring to the current pixel Y(i,j), the horizontal pixels are Y(i,j−2), Y(i,j−1), Y(i,j), Y(i,j+1) and Y(i,j+2), the vertical pixels are Y(i−2,j), Y(i−1,j), Y(i,j), Y(i+1,j) and Y(i+2,j), and the positive diagonal (i.e., top left to bottom right) pixels are Y(i−2,j−2), Y(i−1,j−1), Y(i,j), Y(i+1,j+1) and Y(i+2,j+2).

Figure 4B:
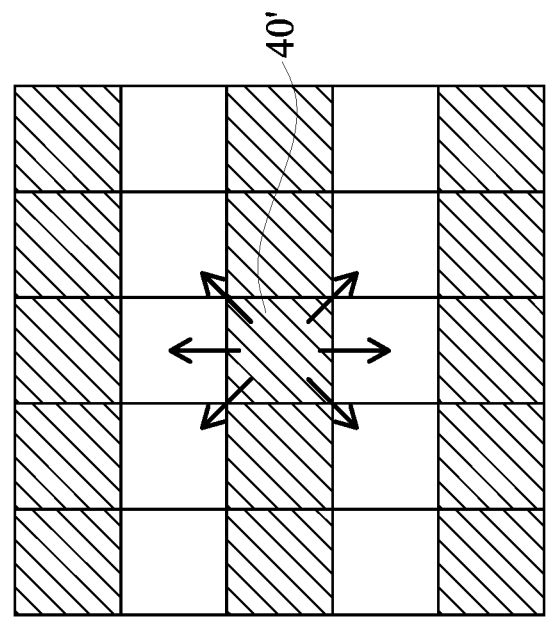
FIG. 4A and FIG. 4B are schematic diagrams respectively showing horizontal and vertical Moiré patterns according to one of the embodiments of the disclosure.
Figure 4A:
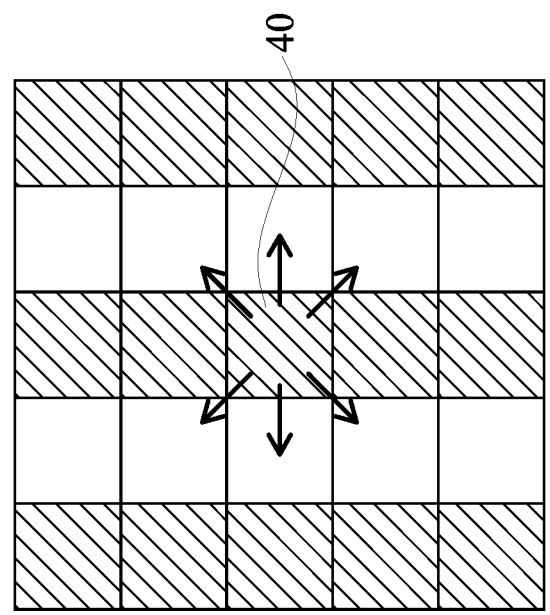

FIG. 4A shows a schematic diagram depicting a pixel array with a vertical Moiré pattern according to one embodiment of the disclosure. In a detection window, a central pixel is a current pixel 40. According to the features of the vertical Moiré pattern, the vertical Moiré pattern is that the brightness values of the vertical pixels are much closer than other directions. It should be noted that the threshold can be introduced to determine the degree of proximity. Other than the vertical pixels, the differences of the brightness values between the current pixel 40 and other adjacent pixels (i.e., left pixel, right pixel, top left pixel, bottom left pixel, top right pixel and bottom right pixel) should be larger based on the threshold. Therefore, the brightness values can be used to find the vertical Moiré pattern.

FIG. 4B is another schematic diagram depicting a pixel array with the horizontal Moiré pattern in one embodiment of the disclosure. The central pixel is a current pixel 40'. Similarly, in FIG. 4B, the characteristic of the horizontal Moiré pattern is that the brightness values of the horizontal pixels are closer than other directions. Other than the horizontal pixels, the differences of brightness values between the current pixel 40' and other adjacent pixels (i.e., top pixel, bottom pixel, top left pixel, bottom left pixel, top right pixel and bottom right pixel) should be larger. The characteristics of brightness values can be used to find the horizontal Moiré pattern.

Embodiment 1: The Horizontal and Vertical Moiré Pattern

Figure 5B:
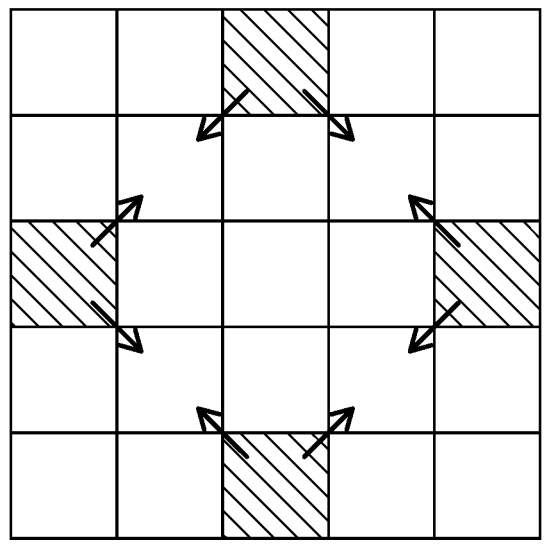
Figure 5A:
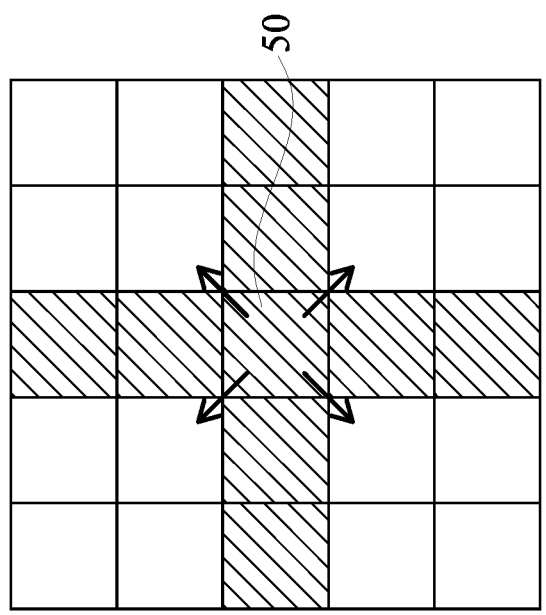
Figure 5C:
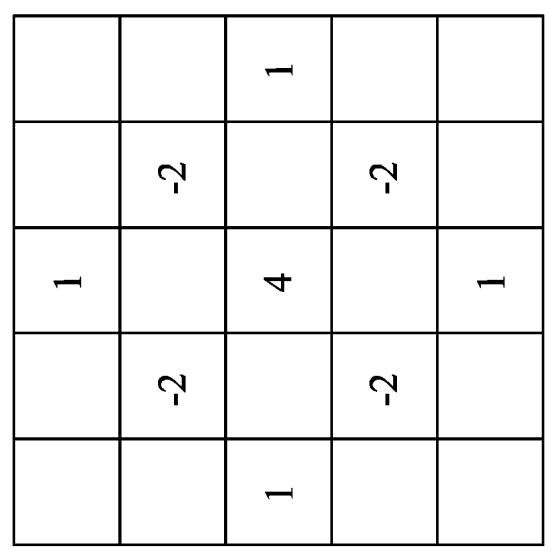

The above-mentioned characteristics of the horizontal and vertical Moiré pattern, as shown in FIG. 5A to FIG. 5C, allows the method of determining the horizontal or vertical Moiré patterns by calculating the differences of brightness values (e.g., 'Y' value of YUV color space) between a current pixel 50 and the adjacent diagonal pixels that are regarded as the critical pixels.

In FIG. 5A, the central pixel is the current pixel 50 that has a brightness difference from the diagonal pixels. The brightness difference is referred to so as to determine the horizontal or vertical Moiré pattern. FIG. 5B shows another aspect in which the brightness differences between the critical pixels and the diagonal pixels in the 5×5 pixel array are used as the basis to determine the horizontal or vertical Moiré pattern. FIG. 5C shows an example that utilizes weighting masks assigned to the critical pixels and the adjacent pixels in the detection window to determine a specific type of Moiré pattern. The weighting mask is set according to the type of Moiré pattern to be determined. The critical pixels can be assigned with higher weighing values while calculating the Moiré pattern response values. For example, the weighting values can be 1 and 4, in which the current pixel 50 can be assigned with the higher weighting value 4 and the other critical pixels can be assigned with the weighting value 1 that are used as the coefficients of the equation. Otherwise, the diagonal pixels adjacent to the critical pixels may be assigned with lower weighting values, e.g. the weighting value −2, for emphasizing the features of a spatial distribution of the image.

Referring to the pixels marked in FIG. 3 and FIG. 5A through FIG. 5C, equation A calculates the horizontal or vertical Moiré pattern response values of each of the pixels of the image within a specific area corresponding to the detection window. A first half of the formula '(4*Y(i,j)+Y(i−2,j)+Y(i,j+2)+Y(i+2,j)+Y(i,j−2))' of equation A is used to calculate the brightness values of the critical pixels in the area, and the brightness values are multiplied by the weighting values shown in FIG. 5C. A second half of the formula '(2*Y(i−1,j−1)+2*Y(i−1,j+1)+2*Y(i+1,j+1)+2*Y(i+1,j−1))' of equation A is used to calculate the brightness values of the diagonal pixels adjacent to the critical pixels, and the brightness values are multiplied by the weighting values shown in FIG. 5C. After that, an absolute value of the first half formula of equation A minus the second half formula of equation A is used to obtain a gradient of the brightness values of the pixels within the area. When the gradient of the brightness values of the whole image is calculated, the horizontal or vertical Moiré pattern can be clearly presented as the difference (i.e., the absolute value of the first and second half formulas of equation A) becomes larger; otherwise, no obvious Moiré pattern is found. The difference indicates the horizontal or vertical Moiré pattern response values (Moire_HV$_{Edge}$) that represent characteristics of edges of the image. The characteristics of edges of the image can be used as the features used to determine the Moiré pattern. The above embodiments also show that Moiré pattern occurs when the sampling frequency of the pixels is consistent with or close to the spatial frequency of stripes.

$$\text{Moire\_HV}_{Edge}=|(4*Y(i,j)+Y(i-2,j)+Y(i,j+2)+Y(i+2,j)+Y(i,j-2))-(2*Y(i-1,j-1)+2*Y(i-1,j+1)+2*Y(i+1,j+1)+2*Y(i+1,j-1))|$$

Equation A:

Next, the detection window is introduced to compare the brightness values of the critical pixels with the brightness values of the corresponding adjacent pixels within an area one-by-one. A statistical method is performed to detect the edges of the image for determining the Moiré pattern.

Equation B and equation C provide a statistical method to calculate horizontal or vertical Moiré pattern feature comparison values. Based on the brightness values mentioned in the description of FIG. 1, when the brightness value Y(i,j) of the current pixel is a relatively high brightness value, as shown in equation B, '$K_{HV}$' denotes a pixel value gap set by a user based on an actual ambient light source and can be used as the threshold for confirming the Moiré pattern if the differences of brightness values between the horizontal and vertical critical pixels (Y(i,j), Y(i−2,j), Y(i,j+2), Y(i+2,j) and Y(i,j−2)) and the adjacent critical pixels are larger than '$K_{HV}$'. It should be noted that the comparison and statistical method for the brightness values can only be applied to the pixels that are confirmed as Moiré pattern according to the Moiré pattern response values.

$$\text{Moire\_HV}_{CMP1}=(Y(i,j)>Y(i-1,j-1)+K_{HV})$$

$$\text{Moire\_HV}_{CMP2}=(Y(i,j)>Y(i-1,j+1)+K_{HV})$$

$$\text{Moire\_HV}_{CMP3}=(Y(i,j)>Y(i+1,j+1)+K_{HV})$$

$$\text{Moire\_HV}_{CMP4}=(Y(i,j)>Y(i+1,j-1)+K_{HV})$$

$$\text{Moire\_HV}_{CMP5}=(Y(i-2,j)>Y(i-1,j-1)+K_{HV})$$

$$\text{Moire\_HV}_{CMP6}=(Y(i-2,j)>Y(i-1,j+1)+K_{HV})$$

$$\text{Moire\_HV}_{CMP7}=(Y(i,j+2)>Y(i-1,j+1)+K_{HV})$$

$$\text{Moire\_HV}_{CMP8}=(Y(i,j+2)>Y(i+1,j+1)+K_{HV})$$

$$\text{Moire\_HV}_{CMP9}=(Y(i+2,j)>Y(i+1,j+1)+K_{HV})$$

$$\text{Moire\_HV}_{CMP10}=(Y(i+2,j)>Y(i+1,j-1)+K_{HV})$$

$$\text{Moire\_HV}_{CMP11}=(Y(i,j-2)>Y(i-1,j-1)+K_{HV})$$

$$\text{Moire\_HV}_{CMP12}=(Y(i,j-2)>Y(i+1,j-1)+K_{HV})$$

Equation B:

If the brightness value Y(i,j) of the current pixel is a relatively low brightness value, as shown in equation C, '$K_{HV}$' is used as the threshold to determine Moiré pattern if the differences of brightness values between the horizontal and vertical critical pixels (Y(i,j), Y(i−2,j), Y(i,j+2), Y(i+2,j) and Y(i,j−2)) and the adjacent pixels is larger than '$K_{HV}$'. It should be noted that '$K_{HV}$' can be used to increase the threshold.

$$\text{Moire\_HV'}_{CMP1}=(Y(i,j)<Y(i-1,j-1)-K_{HV})$$

$$\text{Moire\_HV'}_{CMP2}=(Y(i,j)<Y(i-1,j+1)-K_{HV})$$

$$\text{Moire\_HV'}_{CMP3}=(Y(i,j)<Y(i+1,j+1)-K_{HV})$$

$$\text{Moire\_HV'}_{CMP4}=(Y(i,j)<Y(i+1,j-1)-K_{HV})$$

$$\text{Moire\_HV'}_{CMP5}=(Y(i-2,j)<Y(i-1,j-1)-K_{HV})$$

$$\text{Moire\_HV'}_{CMP6}=(Y(i-2,j)<Y(i-1,j+1)-K_{HV})$$

$$\text{Moire\_HV'}_{CMP7}=(Y(i,j+2)<Y(i-1,j+1)-K_{HV})$$

$$\text{Moire\_HV'}_{CMP8}=(Y(i,j+2)<Y(i+1,j+1)-K_{HV})$$

$$\text{Moire\_HV'}_{CMP9}=(Y(i+2,j)<Y(i+1,j+1)-K_{HV})$$

$$\text{Moire\_HV'}_{CMP10}=(Y(i+2,j)<Y(i+1,j-1)-K_{HV})$$

$$\text{Moire\_HV'}_{CMP11}=(Y(i,j-2)<Y(i-1,j-1)-K_{HV})$$

$$\text{Moire\_HV'}_{CMP12}=(Y(i,j-2)<Y(i+1,j-1)-K_{HV})$$

Equation C:

After that, a statistical result obtained from equation B and equation C with respect to the features of horizontal and vertical Moiré pattern is used to conduct the comparison. For example, as shown in equation D, the statistical result of relatively high brightness values (Y(i,j) of the current pixel) and the statistical result of relatively low brightness values are compared so as to determine if the current pixel has relatively high or low brightness as compared with the adjacent pixels.

$$\text{Moire\_HV}_{CMP\_SUM}=\text{Max}(\Sigma_{N=1}^{12}\text{Moire\_HV}_{CMP_N}, \Sigma_{N=1}^{12}\text{Moire\_HV'}_{CMP_N})$$

Equation D:

Embodiment 2: Positive Diagonal Moiré Pattern

Figure 6B:
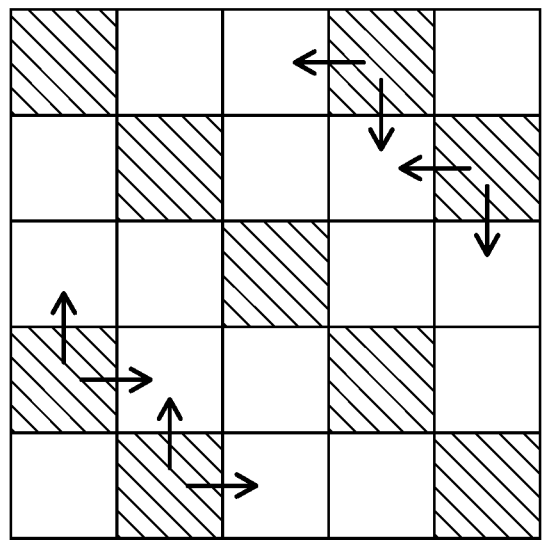
Figure 6A:
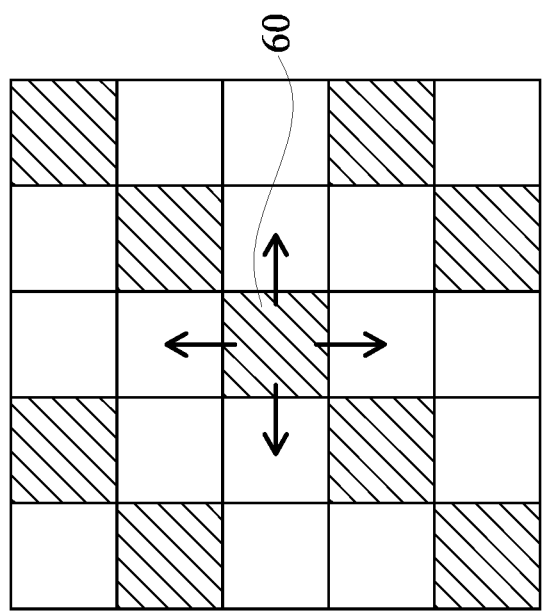
Figure 6C:
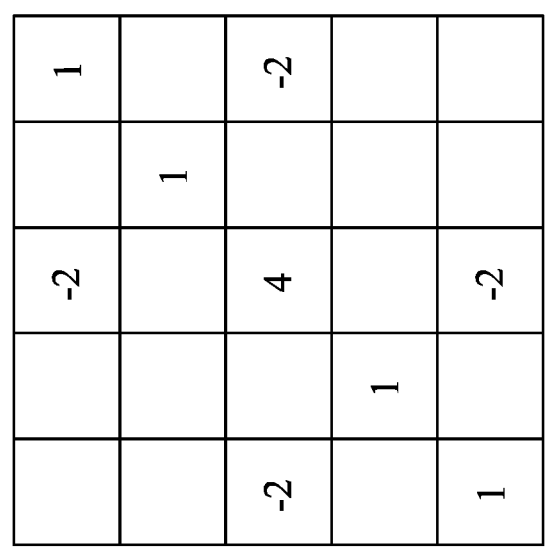

FIG. 6A to FIG. 6C schematically shows the type of positive diagonal Moiré pattern in one embodiment of the disclosure. With 5×5 pixel array as an example, as shown in FIG. 6A, a central pixel is a current pixel 60. In the method for determining Moiré pattern, the differences of brightness values (i.e., 'Y' value) of the current pixel 60 and the horizontal and vertical pixels adjacent to the current pixel 60 are used to determine whether or not any positive diagonal Moiré pattern occurs. As shown by the arrows in the diagram, the differences of brightness values of the current pixel 60 and the adjacent horizontal and vertical pixels are used to determine the positive diagonal Moiré pattern. FIG. 6B shows another aspect that the differences of brightness values between the critical pixels and the corresponding horizontal and vertical pixels in the 5×5 pixel array are used to determine the positive diagonal Moiré pattern. Further, FIG. 6C takes weighting masks as an example. When calculating the Moiré pattern response values, the critical pixels are assigned with higher weighting values, e.g., 4. For example, the current pixel 60 can be assigned with the highest weighting value 4. The other critical pixels can be assigned with the weighting value 1. Further, the horizontal and vertical pixels of the critical pixels are assigned with the lower weighting values, e.g., −2, for showing the features of the spatial distribution of the image.

In view of the marked pixels in FIG. 3 and FIG. 6A through FIG. 6C, equation E calculates the Moiré pattern response values of the positive diagonal pixels of the image in a specific area corresponding to the detection window. A first half of the formula '$(4*Y(i,j)+Y(i−1,j+1)+Y(i−2,j+2)+Y(i+1,j−1)+Y(i+2,j−2))$' of equation E calculates a sum of brightness values of some critical pixels in the area and the brightness values are multiplied by the weighting values shown in FIG. 6C. A second half of the formula '$(2*Y(i−2,j)+2*Y(i,j+2)+2*Y(i+2,j)+2*Y(i,j−2))$' of equation E calculates another sum of brightness values of the horizontal and vertical pixels adjacent to one of the critical pixels, e.g., the current pixel $Y(i,j)$ and the brightness values are multiplied by the weighting values shown in FIG. 6C. An absolute value of the difference between the results of the first half of the formula and the second half of the formula of equation E is used to obtain a gradient of brightness values within the area. The gradients of brightness values of the whole image are calculated. When the difference, i.e., the absolute value, is larger, the positive diagonal Moiré pattern can be clearly presented, otherwise, no obvious Moiré pattern is found. The difference indicates that the positive diagonal Moiré pattern response value ($Moire\_DIAG\_POS_{Edge}$) can be used to determine whether or not the image has the features of the Moiré pattern.

$$Moire\_DIAG\_POS_{Edge}=|(4*Y(i,j)+Y(i−1,j+1)+Y(i−2,j+2)+Y(i+1,j−1)+Y(i+2,j−2))−(2*Y(i−2,j)+2*Y(i,j+2)+2*Y(i+2,j)+2*Y(i,j−2))| \quad \text{Equation E:}$$

Similarly, the detection window is introduced to compare the brightness values of the critical pixels and the corresponding adjacent pixels in an area. A statistical method is performed thereto for determining Moiré pattern by detecting the edges of the image. Equation F and equation G calculate the Moiré pattern feature comparison values of the positive diagonal pixels. If the brightness value (e.g., $Y(i,j)$ depicted in FIG. 1) of the current pixel is a relatively high brightness value, as shown in equation F, '$K_D$' denotes a pixel value gap set by a user based on an actual ambient light source. The pixel value gap is used to confirm the positive diagonal critical pixels ($Y(i,j)$, $Y(i−2,j−1)$, $Y(i−1,j−2)$, $Y(i+1,j+2)$ and $Y(i+2,j+1)$). The difference of the brightness values can be used as the threshold to determine the Moiré pattern. The Moiré pattern can be confirmed if the difference is larger than '$K_D$'. It should be noted that the comparison and statistical method can be performed only to the pixels that are determined as part of Moiré pattern according to the Moiré pattern response values.

$$Moire\_DIAG\_POS_{CMP1}=(Y(i,j)>Y(i−2,j)+K_D)$$

$$Moire\_DIAG\_POS_{CMP2}=(Y(i,j)>Y(i,j+2)+K_D)$$

$$Moire\_DIAG\_POS_{CMP3}=(Y(i,j)>Y(i+2,j)+K_D)$$

$$Moire\_DIAG\_POS_{CMP4}=(Y(i,j)>Y(i,j−2)+K_D)$$

$$Moire\_DIAG\_POS_{CMP5}=(Y(i−2,j−1)>Y(i−2,j)+K_D)$$

$$Moire\_DIAG\_POS_{CMP6}=(Y(i−2,j−1)>Y(i−1,j−1)+K_D)$$

$$Moire\_DIAG\_POS_{CMP7}=(Y(i−1,j−2)>Y(i−1,j−1)+K_D)$$

$$Moire\_DIAG\_POS_{CMP8}=(Y(i−1,j−2)>Y(i,j−2)+K_D)$$

$$Moire\_DIAG\_POS_{CMP9}=(Y(i+1,j+2)>Y(i,j+2)+K_D)$$

$$Moire\_DIAG\_POS_{CMP10}=(Y(i+1,j+2)>Y(i+1,j+1)+K_D)$$

$$Moire\_DIAG\_POS_{CMP11}=(Y(i+2,j+1)>Y(i+2,j)+K_D)$$

$$Moire\_DIAG\_POS_{CMP12}=(Y(i+2,j+1)>Y(i+1,j+1)+K_D) \quad \text{Equation F:}$$

If the brightness value $Y(i,j)$ of the current pixel is a relatively low brightness value, as shown in equation G, '$K_D$' may also act as the threshold to determine whether or not any Moiré pattern occurs to the current pixel since the differences between the brightness values of the positive diagonal critical pixels and the brightness values of the adjacent pixels are larger than '$K_D$'. It should be noted that '$K_D$' of equation F or equation G is configured to increase the threshold of brightness difference.

$$Moire\_DIAG\_POS'_{CMP1}=(Y(i,j)<Y(i−2,j)−K_D)$$

$$Moire\_DIAG\_POS'_{CMP2}=(Y(i,j)<Y(i,j+2)−K_D)$$

$$Moire\_DIAG\_POS'_{CMP3}=(Y(i,j)<Y(i+2,j)−K_D)$$

$$Moire\_DIAG\_POS'_{CMP4}=(Y(i,j)<Y(i,j−2)−K_D)$$

$$Moire\_DIAG\_POS'_{CMP5}=(Y(i−2,j−1)<Y(i−2,j)−K_D)$$

$$Moire\_DIAG\_POS'_{CMP6}=(Y(i−2,j−1)<Y(i−1,j−1)−K_D)$$

$$Moire\_DIAG\_POS'_{CMP7}=(Y(i−1,j−2)<Y(i−1,j−1)−K_D)$$

$$Moire\_DIAG\_POS'_{CMP8}=(Y(i−1,j−2)<Y(i,j−2)−K_D)$$

$$Moire\_DIAG\_POS'_{CMP9}=(Y(i+1,j+2)<Y(i,j+2)−K_D)$$

$$Moire\_DIAG\_POS'_{CMP10}=(Y(i+1,j+2)<Y(i+1,j+1)−K_D)$$

$$Moire\_DIAG\_POS'_{CMP11}=(Y(i+2,j+1)<Y(i+2,j)−K_D)$$

$$Moire\_DIAG\_POS'_{CMP12}=(Y(i+2,i+1)<Y(i+1,j+1)−K_D) \quad \text{Equation G:}$$

After that, the statistical results of the features of the Moiré pattern of the positive diagonal pixels obtained by equation F or equation G are used to conduct comparison. In equation H, the statistical results obtained by equation F or equation G are used to compare with the statistical results of the relatively high and relatively low brightness value of the current pixel so as to determine the current pixel is the pixel with relatively high or relatively low brightness value.

$$Moire\_DIAG\_POS_{CMP\_SUM} = Max\left(\sum_{N=1}^{12} Moire\_DIAG\_POS_{CMP_N}, \sum_{N=1}^{12} Moire\_DIAG\_POS'_{CMP_N}\right) \quad \text{Equation H}$$

Embodiment 3: Negative Diagonal Moiré Pattern

Figure 7B:
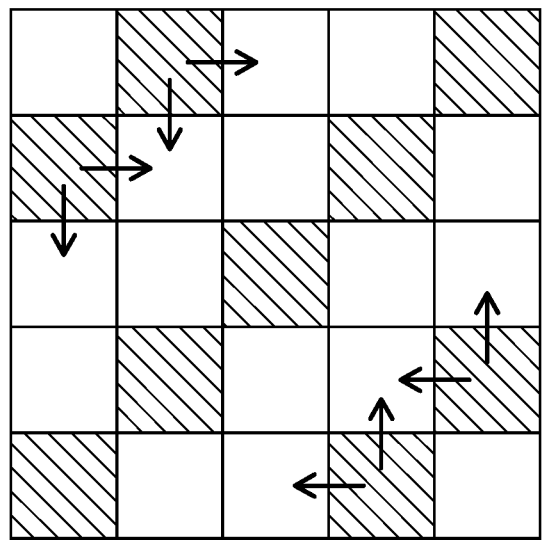
Figure 7A:
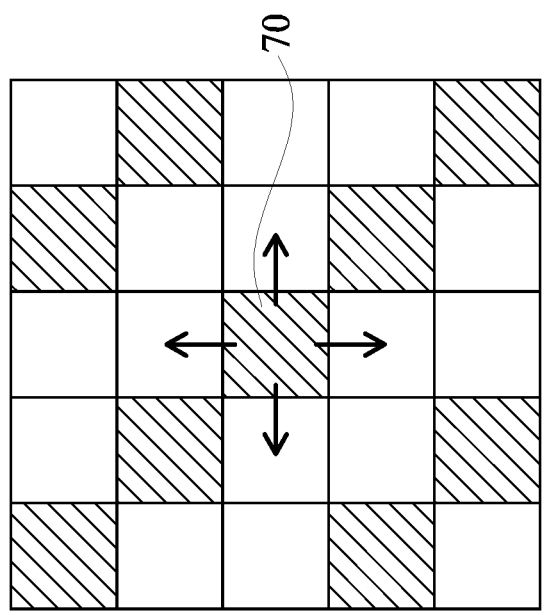
Figure 7C:
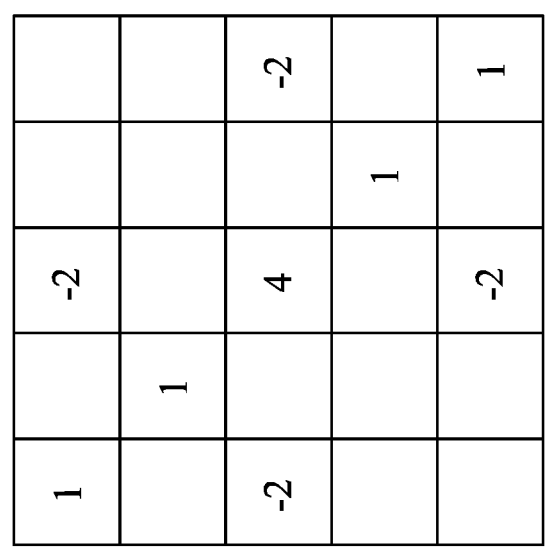

The negative diagonal Moiré pattern can be exemplarily shown in FIGS. 7A to 7C. With a 5×5 pixel array as an example, such as in FIG. 7A, a central pixel is regarded as a current pixel 70. The method for determining Moiré pattern determines whether or not any negative diagonal Moiré pattern exists by calculating the differences of the brightness values between the current pixel 70 and the horizontal and vertical adjacent pixels referring to the arrows shown in the diagrams. FIG. 7B shows a further diagram depicting the differences of the brightness values between several critical pixels and the horizontal and vertical adjacent pixels in the 5×5 pixel array are regarded as the basis to determine the negative diagonal Moiré pattern.

Further, FIG. 7C shows an exemplary introducing the concept of weighting mask to determine the negative diagonal Moiré pattern. The critical pixels are assigned with higher weighting values when calculating the Moiré pattern response value. For example, the current pixel 70 can be assigned with the highest weighting value 4, and other critical pixels can be assigned with the weighting value 1; otherwise, the horizontal and vertical critical pixels can be assigned with the lower weighting values, e.g., −2. The concept of weighting mask can be used to present the spatial distribution of the image.

In view of the marked pixels shown in FIG. 3 and FIG. 7A through 7C, the equation I calculates Moiré pattern response values of the negative diagonal pixels for every pixel of the image within a specific area corresponding to a detection window. A first half of the formula of an absolute value of equation I is "(4*Y(i,j)+Y(i−1,j−1)+Y(i−2,j−2)+Y(i+1,j+1)+Y(i+2,j+2))" that is used to calculate the brightness values of the critical pixel in the area. The brightness values of the critical pixels are further multiplied by the weighting values shown in FIG. 7C. A second half of the formula of the equation I is "(2*Y(i−2,j)+2*Y(i,j+2)+2*Y(i+2,j)+2*Y(i,j−2))" that is used to calculate a sum of the brightness values of the critical pixels, e.g., the horizontal and vertical adjacent pixels of the current pixel Y(i,j)). The brightness values of the critical pixels can also be multiplied by the weighting values shown in FIG. 7C. The absolute value of the difference between the results of the first half of the formula and the second half of the formula of the equation I obtain a gradient of brightness values of the pixels within the area. When the gradients of brightness values of the whole image are calculated, the negative diagonal Moiré pattern of the image can be clearly presented if the mentioned absolute values of equation I is larger; otherwise, no obvious negative diagonal Moiré pattern is found. The difference is used to obtain the negative diagonal Moiré pattern response value (Moire_DIAG_POS$_{Edge}$) so as to determine the Moiré pattern in the image by obtaining the characteristics of edges of the image.

$$\text{Moire\_DIAG\_NEG}_{Edge}=|(4*Y(i,j)+Y(i-1,j-1)+Y(i-2,j-2)+Y(i+1,j+1)+Y(i+2,j+2))-(2*Y(i-2,j)+2*Y(i,j+2)+2*Y(i+2,j)+2*Y(i,j-2))| \quad \text{Equation I:}$$

Similarly, within the detection window, the brightness values of the critical pixels and the corresponding adjacent pixels in the area where the pixels are located are pixel-by-pixel counted through a statistical method. One of the objectives of this aspect is to determine the Moiré pattern by detecting the characteristics of edges of the image. Equation J and equation K indicate statistical calculations of the negative diagonal Moiré pattern feature comparison values. Referring to brightness values (Y(i,j)) indicated in FIG. 3, if the brightness value of the current pixel is a relatively high value, as shown in equation J, '$K_D$' denotes a pixel value gap set by a user according to practical ambient light source that can be used as the threshold for determining the Moiré pattern. The Moiré pattern is determined if the differences of the brightness values between the negative diagonal pixels and the corresponding adjacent pixels are larger than the threshold. The pixels to be determined as Moiré pattern through the Moiré pattern response value can only be used for further comparison and statistical method.

$$\text{Moire\_DIAG\_NEG}_{CMP1}=(Y(i,j)>Y(i-2,j)+K_D)$$

$$\text{Moire\_DIAG\_NEG}_{CMP2}=(Y(i,j)>Y(i,j+2)+K_D)$$

$$\text{Moire\_DIAG\_NEG}_{CMP3}=(Y(i,j)>Y(i+2,j)+K_D)$$

$$\text{Moire\_DIAG\_NEG}_{CMP4}=(Y(i,j)>Y(i,j-2)+K_D)$$

$$\text{Moire\_DIAG\_NEG}_{CMP5}=(Y(i-2,j+1)>Y(i-2,j)+K_D)$$

$$\text{Moire\_DIAG\_NEG}_{CMP6}=(Y(i-2,j+1)>Y(i-1,j+1)+K_D)$$

$$\text{Moire\_DIAG\_NEG}_{CMP7}=(Y(i-1,j+2)>Y(i-1,j+1)+K_D)$$

$$\text{Moire\_DIAG\_NEG}_{CMP8}=(Y(i-1,j+2)>Y(i,j+2)+K_D)$$

$$\text{Moire\_DIAG\_NEG}_{CMP9}=(Y(i+1,j-2)>Y(i,j-2)+K_D)$$

$$\text{Moire\_DIAG\_NEG}_{CMP10}=(Y(i+1,j-2)>Y(i+1,j-1)+K_D)$$

$$\text{Moire\_DIAG\_NEG}_{CMP11}=(Y(i+2,j-1)>Y(i+1,j-1)+K_D)$$

$$\text{Moire\_DIAG\_NEG}_{CMP12}=(Y(i+2,j-1)>Y(i+2,j)+K_D) \quad \text{Equation J:}$$

If the brightness value Y(i,j) of the current pixel is a relatively low value, as shown in equation K, '$K_D$' is used for increasing the threshold for brightness difference and as the threshold for determining Moiré pattern. The Moiré pattern can be confirmed if the differences of brightness values between the negative diagonal critical pixels and the adjacent pixels are larger than the threshold.

$$\text{Moire\_DIAG\_NEG}'_{CMP1}=(Y(i,j)<Y(i-2,j)-K_D)$$

$$\text{Moire\_DIAG\_NEG}'_{CMP2}=(Y(i,j)<Y(i,j+2)-K_D)$$

$$\text{Moire\_DIAG\_NEG}'_{CMP3}=(Y(i,j)<Y(i+2,j)-K_D)$$

$$\text{Moire\_DIAG\_NEG}'_{CMP4}=(Y(i,j)<Y(i,j-2)-K_D)$$

$$\text{Moire\_DIAG\_NEG}'_{CMP5}=(Y(i-2,j+1)<Y(i-2,j)-K_D)$$

$$\text{Moire\_DIAG\_NEG}'_{CMP6}=(Y(i-2,j+1)<Y(i-1,j+1)-K_D)$$

$$\text{Moire\_DIAG\_NEG}'_{CMP7}=(Y(i-1,j+2)<Y(i-1,j+1)-K_D)$$

$$\text{Moire\_DIAG\_NEG}'_{CMP8}=(Y(i-1,j+2)<Y(i,j+2)-K_D)$$

$$\text{Moire\_DIAG\_NEG}'_{CMP9}=(Y(i+1,j-2)<Y(i,j-2)-K_D)$$

$$\text{Moire\_DIAG\_NEG}'_{CMP10}=(Y(i+1,j-2)<Y(i+1,j-1)-K_D)$$

$$\text{Moire\_DIAG\_NEG}'_{CMP11}=(Y(i+2,j-1)<Y(i+1,j-1)-K_D)$$

$$\text{Moire\_DIAG\_NEG}'_{CMP12}=(Y(i+2,j-1)<Y(i+2,j)-K_D) \quad \text{Equation K:}$$

After that, the statistical results of the features of the negative diagonal Moiré pattern obtained in equation J and equation K are compared, as shown in equation L. In equation L, the statistical results of the relatively high and the relatively low brightness values of the pixels are compared for determining that the current pixel is relatively high or low pixel.

$$\text{Moire\_DIAG\_NEG}_{CMP\_SUM} = \text{Max}\left(\sum_{N=1}^{12} \text{Moire\_DIAG\_NEG}_{CMP_N}, \sum_{N=1}^{12} \text{Moire\_DIAG\_NEG}'_{CMP_N}\right)$$

Equation L

According to the above embodiments, in the method for determining Moiré pattern, the horizontal, the vertical, positive and negative diagonal Moiré pattern response values are firstly calculated. Next, the brightness values of the current pixel and the adjacent horizontal, vertical, and positive/negative diagonal pixels are compared. The comparison results are then calculated for determining the brightness characteristics of the current pixel and the adjacent pixels. Based on the threshold predetermined by the system, the Moiré pattern response values and the statistical results are used to determine if the current pixel is part of the Moiré pattern. The type and location of the Moiré pattern can also be determined if the current pixel is determined as part of the Moiré pattern.

According to one of the embodiments of the present disclosure, when the Moiré pattern response value is larger than the first threshold, it is determined that there are obvious brightness changes between the current pixel and the adjacent pixels. Therefore, the pixel edges of the image can be determined. The pixel edges of the image show features of light and dark intervals such as the Moiré pattern. Otherwise, if the Moiré pattern response value is not larger than the first threshold, it cannot conclude that the current pixel has the feature of the Moiré pattern. Further, when the Moiré pattern feature comparison value is larger than the second threshold, it is determined that the current pixel is relatively light or relatively dark. In the meantime, if the Moiré pattern response value is also larger than the first threshold when the Moiré pattern feature comparison value is larger than the second threshold, it confirms that the current pixel is truly part of the Moiré pattern.

Figure 8:
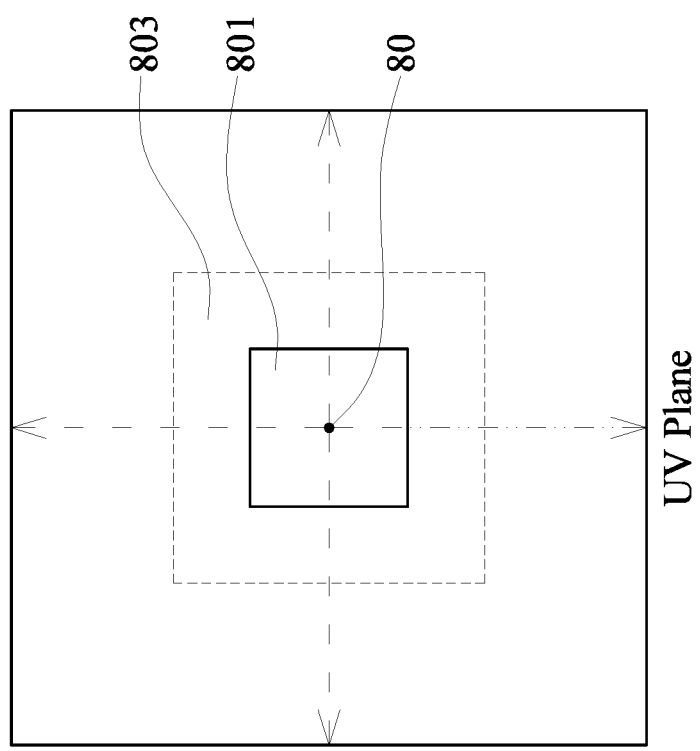
FIG. 8 is a schematic diagram depicting a color space in which a method for suppressing Moiré pattern is performed according to one embodiment of the disclosure.

Furthermore, if the Moiré pattern of the image is confirmed, the circuit system performs a color noise suppression process upon the Moiré pattern pixels. In an exemplary example, the color noise suppression process is performed upon the Moiré pattern pixels in a YUV color space, as shown in FIG. 8. FIG. 8 shows a UV (chrominance-saturation) plane when Y equals to 128 in the YUV color space. The pixels to be determined as Moiré patterns are mapped to the UV plane of the YUV color space. The saturation of the pixel is lower when the pixel is closer to a coordinate center 80 of the UV plane. The pixel is more like a grayscale color if the saturation of the pixel is lower. The saturation of the pixel is higher when the pixel is away from the coordinate center 80. It should be noted that different quadrants of the UV plane represent different colors.

According to the coordinates of the U/V values of the Moiré pattern pixels in the YUV color space, the pixels can be divided into two or three zones of the UV plane and undergo different image-processing processes. In FIG. 8, a central zone indicates a color-suppression range 801, and the pixels in the color-suppression range 801 are suppressed to grayscale colors. The image with suppressed Moiré pattern pixels is then outputted.

In one embodiment of the present disclosure, the UV plane can be divided into three zones. The zone between the dotted area and the color-suppression range 801 indicates a gradual color-suppression range 803. The pixels located in the gradual color-suppression range 803 are processed by the color noise suppression process according to a suppression rate that is set up based on a distance between the location of every pixel and the coordinate center 80. The various suppression rates allow the color noise suppression process to obtain different degrees of grayscale color pixels. It should be noted that the suppression rate can be changed linearly or non-linearly. However, in this aspect, the pixels outside the gradual color-suppression range 803 may retain their original U/V values.

In one embodiment of the disclosure, the color-suppression range 801 can be a moveable rectangular zone but still needs to cover the coordinate center 80. The color-suppression range 801 can be flexibly moved for performing the color noise suppression process based on different scenarios or user preferences. Equation M shows a formula of the color noise suppression process.

$$C_{out} = (C_{in} - 128) * (1 - \text{supp\_rate}) + 128$$

Equation M:

In equation M, '$C_{in}$' is an input U or V value, '$C_{out}$' is an output U or V value, and 'supp_rate' is a suppression rate that is set between 0 and 1. The suppression rate is calculated according to the distance from the coordinate center 80 within the gradual color-suppression range 803. The suppression rate gradually decreases as the pixel is away from the coordinate center 80. Further, an interpolation or a filtering method is performed to calculate the suppression rate being between 0 and 1. The numeral '128' of equation M allows the U and V values being between 0 and 255 in the YUV color space to be transformed to the UV plane, in which the transformation requires a displacement of 128. The numeral '128' should be changed based on practical needs. The calculation of the suppression rate is not limited to the above embodiments.

As the above embodiments, the method for determining Moiré pattern and the method for suppressing Moiré patterns are operated in the circuit system. The brightness information of the pixels in a specific color space can be first obtained. A detection window is selected. The brightness relationship among the pixels renders a spatial distribution of brightness so as to obtain the characteristics of edges of the image. The Moiré pattern and its type can therefore be determined. The type of Moiré pattern can be horizontal, vertical, or positive/negative diagonal. The features of each of the types of Moiré patterns are counted as the feature comparison value in order to confirm whether or not the pixel is part of the Moiré pattern. After that, the method for suppressing Moiré pattern can be performed upon those Moiré pattern pixels.

Figure 9:
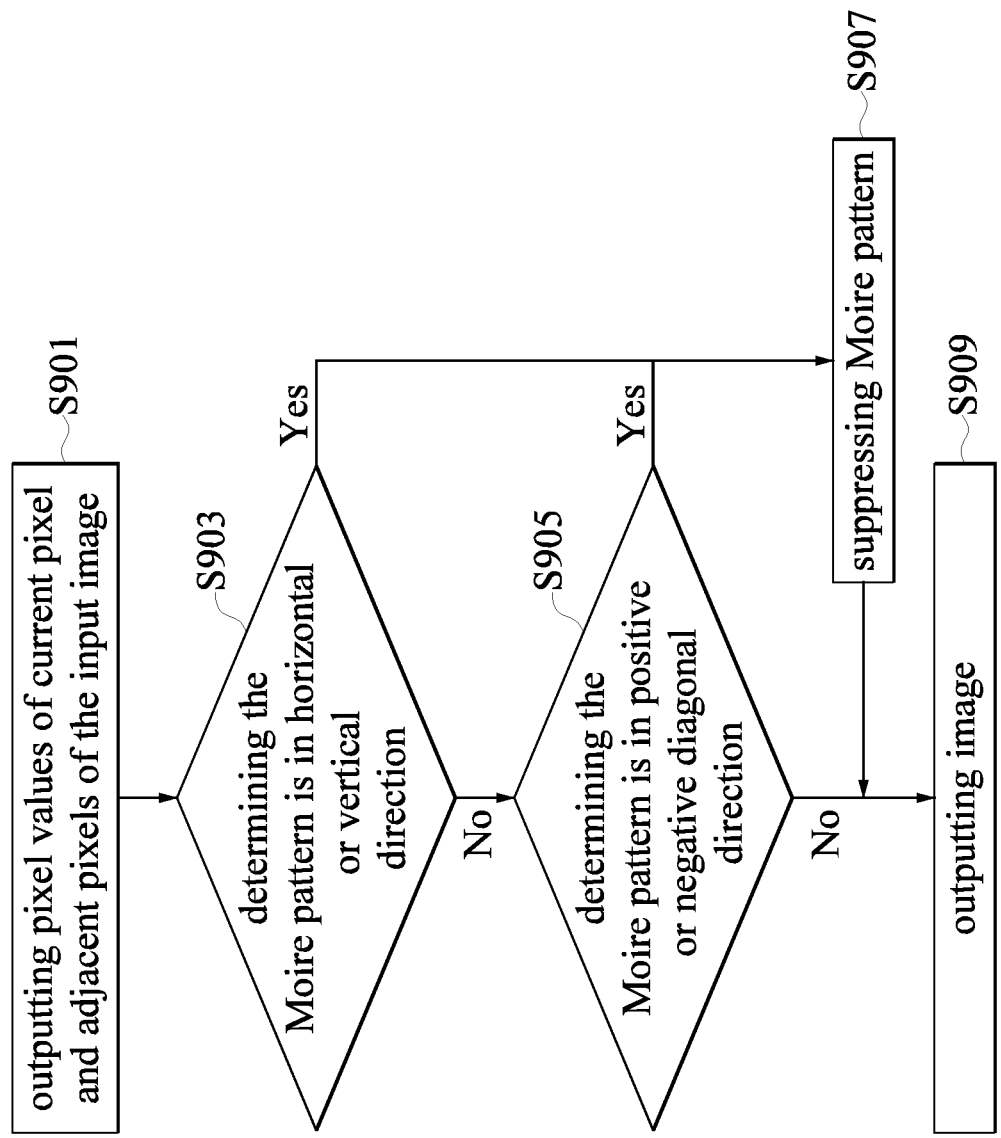
FIG. 9 shows a flow chart describing the method for suppressing Moiré pattern in one embodiment of the disclosure.

The method for determining and suppressing Moiré pattern operated in the circuit system is referred to as the flow chart shown in FIG. 9. In step S901, when the circuit system receives an image, the pixels of the image are pixel-by-pixel processed for determining if the pixels are part of the Moiré pattern. The relationship between a current pixel and the adjacent pixels within a detection window can be used to obtain the characteristics of spatial distribution. For the horizontal or vertical Moiré pattern, the critical pixels within the detection window are assigned with weighting values so as to calculate horizontal and vertical Moiré pattern response values. The brightness differences between the critical pixels and the adjacent pixels are compared with the first threshold in order to determine the direction of the Moiré pattern.

In step S903, while processing the pixels pixel-by-pixel, the horizontal or vertical Moiré pattern can be determined. If the image includes the horizontal or vertical Moiré pattern, the color noise suppression process is performed upon the pixels which are determined as part of the Moiré pattern (step S907). An image is outputted after the suppression process (step S909); otherwise, the process continues onto step S905 for determining whether or not the image includes positive or negative diagonal Moiré patterns. If the image includes the diagonal Moiré pattern, such as step S907, the color noise suppression process is performed upon the pixels which are determined as part of the Moiré pattern. An image is outputted after the suppression process (step S909); otherwise, the image is determined without Moiré pattern if the image does not have the diagonal Moiré pattern. The image can be directly outputted (step S909). Thus, the method for determining and suppressing the Moiré pattern and the circuit system are therefore achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for determining a Moiré pattern, comprising:
   obtaining a brightness information of a plurality of pixels of an image;
   setting a detection window for the image and selecting a plurality of critical pixels used to determine types of the Moiré pattern within the detection window;
   pixel-by-pixel calculating a Moiré pattern response value of each of the plurality of critical pixels and corresponding multiple adjacent pixels within the detection window; wherein the Moiré pattern response value is used to determine if the image has characteristics of the Moiré pattern;
   for each of the pixels, comparing a brightness information of the critical pixels with the adjacent pixels corresponding to each of the critical pixels within the detection window, and calculating comparison results so as to determine a brightness characteristic of each of the pixel; and
   confirming a type and position of the Moiré pattern within the image according to the Moiré pattern response value and statistical result;
   wherein the type of Moiré pattern is classified as a horizontal Moiré pattern, a vertical Moiré pattern, a positive diagonal Moiré pattern, or a negative diagonal Moiré pattern.

2. The method according to claim 1, wherein the brightness information with respect to the pixels is a brightness value in a YUV color space, or an average value of three color channels in an RGB color space.

3. The method according to claim 2, wherein, when the image is received, a color space transformation is performed for transforming the image to the YUV color space or the RGB color space.

4. The method according to claim 1, wherein, in the step of calculating the Moiré pattern response value, a weighting mask is set within the detection window, and the Moiré pattern response value is calculated by respectively multiplying the plurality of critical pixels and the corresponding adjacent pixels by weighting values.

5. The method according to claim 4, wherein, in the step of calculating the Moiré pattern response value, the weighting mask is set according to the type of the Moiré pattern to be determined, wherein the plurality of critical pixels are configured to have higher weighting values and the adjacent pixels are configured to have lower weighting values.

6. The method according to claim 5, wherein the Moiré pattern response value with respect to each of the pixels is compared with a first threshold so as to obtain brightness changes between the pixel and the adjacent pixels for further determining if the image has features of the Moiré pattern.

7. The method according to claim 1, wherein, when comparing the brightness information between the plurality of critical pixels and the corresponding adjacent pixels, a second threshold is introduced to confirm the brightness characteristics of each of the pixels.

8. A method for suppressing Moiré pattern, comprising:
   receiving an image, transforming the image to a YUV color space for retrieving brightness values of a plurality of pixels of the image;
   setting a detection window and selecting a plurality of critical pixels within the detection window for determining types of Moiré pattern;
   pixel-by-pixel calculating a Moiré pattern response value of each of the plurality of critical pixels and corresponding multiple adjacent pixels within the detection window; wherein the Moiré pattern response value is used to determine if the image has features of the Moiré pattern;
   for each of the pixels, comparing a brightness values of the critical pixels with the adjacent pixels corresponding to each of the critical pixels within the detection window, and calculating comparison results so as to determine a brightness characteristic of the each of the pixels;
   confirming a type and position of Moiré pattern within the image according to the Moiré pattern response value and statistical result; and
   performing a color noise suppression on the pixels that are determined as the Moiré pattern, wherein:
      a plurality of pixels to be determined as Moiré pattern are mapped to a UV plane of the YUV color space; and
      performing a suppression to pixel colors of the pixels within a color-suppression range in the UV plane as grayscale colors.

9. The method according to claim 8, wherein, in the step of calculating the Moiré pattern response value, a weighting mask is set within the detection window, and the Moiré pattern response value is calculated by respectively multiplying the plurality of critical pixels and the corresponding adjacent pixels by weighting values.

10. The method according to claim 9, wherein, in the step of calculating the Moiré pattern response value, the weighting mask is set within the detection window according to the type of the Moiré pattern to be determined, wherein the plurality of critical pixels are configured to have higher weighting values and the adjacent pixels are configured to have lower weighting values.

11. The method according to claim 10, wherein the Moiré pattern response value with respect to each of the pixels is compared with a first threshold so as to obtain brightness changes between the pixel and the adjacent pixels for further determining if the image has features of Moiré pattern.

12. The method according to claim 8, wherein, when comparing the brightness values between the plurality of critical pixels and the corresponding adjacent pixels, a second threshold is introduced to confirm the brightness characteristics of each of the pixels.

13. The method according to claim 8, wherein, in the step of performing color noise suppression to the plurality of pixels to be determined as part of Moiré pattern, a gradual color-suppression range is distinguished from the UV plane, and a suppression rate is set based on a distance from each of the pixels within the gradual color-suppression range to a coordinate center of the UV plane; the color noise suppression is performed on each of the pixels within the gradual color-suppression range according to the suppression rate.

14. The method according to claim 8, wherein the type of Moiré pattern is classified as a horizontal Moiré pattern, a vertical Moiré pattern, a positive diagonal Moiré pattern, or a negative diagonal Moiré pattern.

15. A circuit system, comprising:
a processor and a memory, wherein the processor is used to perform a method for determining a Moiré pattern including:
receiving an image, transforming the image to a YUV color space for retrieving brightness values of a plurality of pixels of the image;
setting a detection window and selecting a plurality of critical pixels within the detection window for determining types of the Moiré pattern;
pixel-by-pixel calculating a Moiré pattern response value of each of the plurality of critical pixels and corresponding multiple adjacent pixels within the detection window; wherein the Moiré pattern response value is used to determine if the image has features of the Moiré pattern;
for each of the pixels, comparing a brightness values of the critical pixels with the adjacent pixels corresponding to each of the critical pixels within the detection window, and calculating comparison results so as to determine the brightness characteristics of each of the pixel; and
confirming a type and position of Moiré pattern within the image according to the Moiré pattern response value and statistical result so as to perform color noise suppression upon the pixels that are determined as the Moiré pattern.

16. The circuit system according to claim 15, wherein, in the step of calculating the Moiré pattern response value, a weighting mask is set within the detection window according to the type of Moiré pattern to be determined, wherein the plurality of critical pixels are configured to have higher weighting values and the adjacent pixels are configured to have lower weighting values; the Moiré pattern response value is calculated by respectively multiplying the plurality of critical pixels and the corresponding adjacent pixels by the weighting values.

17. The circuit system according to claim 16, wherein the Moiré pattern response value with respect to each of the pixels is compared with a first threshold so as to obtain brightness changes between the pixel and the adjacent pixels for further determining if the image has features of the Moiré pattern; when comparing the brightness value between the plurality of critical pixels and the corresponding adjacent pixels, a second threshold is introduced to confirm brightness characteristics of each of the pixels.

18. The circuit system according to claim 15, wherein, in the step of performing color noise suppression to the plurality of pixels to be determined as part of the Moiré pattern, the pixels being determined as part of the Moiré pattern are mapped to a UV plane of the YUV color space, and the colors of the pixels within a color-suppression range in the UV plane are suppressed as grayscale colors; a suppression rate is set based on a distance from each of the pixels within a gradual color-suppression range in the UV plane to a coordinate center of the UV plane; the color noise suppression is performed on each of the pixels within the gradual color-suppression range according to the suppression rate.

19. The circuit system according to claim 15, wherein the type of the Moiré pattern is classified as a horizontal Moiré pattern, a vertical Moiré pattern, a positive diagonal Moiré pattern, or a negative diagonal Moiré pattern.

* * * * *